(12) United States Patent
Sampath et al.

(10) Patent No.: US 8,196,097 B1
(45) Date of Patent: Jun. 5, 2012

(54) METHOD AND APPARATUS FOR EXTENDING A SOFTWARE GADGET

(75) Inventors: Satish Sampath, Bangalore (IN); Carolyn Au, Pacifica, CA (US); Omar Khan, San Francisco, CA (US); Andrew M. Scherkus, Oakville (CA)

(73) Assignee: Google Inc., Mountain View, CA (US)

( * ) Notice: Subject to any disclaimer, the term of this patent is extended or adjusted under 35 U.S.C. 154(b) by 1153 days.

(21) Appl. No.: 11/713,412

(22) Filed: Mar. 2, 2007

(51) Int. Cl.
  *G06F 9/44* (2006.01)
(52) U.S. Cl. ......... 717/110; 717/111; 717/115; 719/329
(58) Field of Classification Search .................. 717/110, 717/111, 115; 719/329
  See application file for complete search history.

(56) References Cited

U.S. PATENT DOCUMENTS

| | | | | |
|---|---|---|---|---|
| 6,879,672 B2 * | 4/2005 | Broussard et al. | ....... | 379/201.03 |
| 7,743,336 B2 * | 6/2010 | Louch et al. | ................. | 715/766 |
| 7,822,806 B2 * | 10/2010 | Frank et al. | .................... | 709/203 |
| 7,836,456 B1 * | 11/2010 | Violleau et al. | ............... | 719/315 |
| 2003/0048891 A1 * | 3/2003 | Broussard et al. | ........ | 379/201.03 |
| 2003/0158975 A1 * | 8/2003 | Frank et al. | .................... | 709/331 |
| 2004/0215740 A1 * | 10/2004 | Frank et al. | .................... | 709/217 |
| 2006/0248508 A1 * | 11/2006 | Jeghers | .......................... | 717/114 |
| 2007/0101291 A1 * | 5/2007 | Forstall et al. | ................ | 715/805 |

OTHER PUBLICATIONS

Adam Wojciechowski "An Improved Web System for Pixel Advertising", 2006.*
Koppen et al. "Cineast—An Extensible Web Browser", 1997.*

* cited by examiner

*Primary Examiner* — Phillip Nguyen
(74) *Attorney, Agent, or Firm* — Haynes Beffel & Wolfeld LLP; Ernest J. Beffel, Jr.

(57) ABSTRACT

One embodiment of the present invention provides a system for extending a gadget. During operation, the system initially executes a gadget extension which extends a host gadget. In doing so, the system obtains from the gadget extension a specifier for the host gadget and a specifier for an interface. Next, the system establishes a communication interface between the gadget extension and the host gadget through the interface. Finally, the system uses functionality of the host gadget within the gadget extension via communication through the communication interface.

24 Claims, 4 Drawing Sheets

METHOD AND APPARATUS FOR EXTENDING A SOFTWARE GADGET

BACKGROUND

1. Field of the Invention

The present invention relates to the task of developing software. More specifically, the present invention relates to a method and an apparatus for extending a software gadget.

2. Related Art

As people become increasingly reliant on computer systems to manage virtually every aspect of their lives, they look for easier ways to manage and display information that is relevant to them. Initially, people used different programs to manage different aspects of their lives, and they had to execute each program to view the information. For example, they typically used an email client to manage their email, a financial application to manage their finances, and a calendar program to manage their schedule.

As time progressed, these programs became progressively more sophisticated, and people began using fewer programs with more functionality. For example, personal information managers combine the resources of email clients, calendars, contact managers, task list programs, and more. In addition, portal sites began to aggregate information from different locations and to present a user with a unified view of online content. At this point, an individual typically had a couple programs to manage their personal information, and a few aggregation sites to manage the online content that was important to them.

Recent years have seen the development of component frameworks, which allow the user to mix online content and offline content in one consolidated view. Using such a component framework, virtually everything that is available within any program on your computer system or everything that is available online can be viewed and manipulated in a highly-customizable component.

These components, commonly referred to as gadgets, widgets, applets, sidebars, and by various other names, are typically very small pieces of code that provide a single functionality, or several closely related functionalities, such as displaying the weather in a given city, displaying the daily statistics of an investment portfolio, displaying the next appointment on a user's calendar, or providing the top news stories from various news sources. These components are widely distributed, easy to obtain and install, and can be arranged in virtually any manner a user sees fit.

One major drawback with these components that results from their single functionality is that it can be difficult to obtain components for resources that are not widely used. For example, it is very easy to find components to display the current weather in a location of your choosing, but it can be very difficult, if not impossible, to find a component to display information that is relevant to a small group of people. Furthermore, a user frequently uses a component for a specific service, such as tracking a package with a specific parcel carrier, and would like to be able to use that same component with a different related service, such as tracking a package with a different parcel carrier. However, unless the component was written to interact with the second parcel carrier, the user is out of luck.

In order to use components to produce a service which is similar to a service provided by an existing component, a user typically has to wait for such a component to be developed, or must duplicate the functionality of the existing component by writing a new component. Unfortunately, many users lack the skills or resources to write a new component, and components that are of little interest to others might never be developed.

Hence, what is needed is a method for extending the functionality of components without the problems described above.

SUMMARY

One embodiment of the present invention provides a system for extending a gadget. During operation, the system initially executes a gadget extension which extends a host gadget. In doing so, the system obtains from the gadget extension a specifier for the host gadget and a specifier for an interface. Next, the system establishes a communication interface between the gadget extension and the host gadget through the interface. Finally, the system uses functionality of the host gadget within the gadget extension via communication through the communication interface.

In a variation on this embodiment, upon initially executing a second-level gadget extension which extends the gadget extension, the system obtains a specifier for the gadget extension and a specifier for an interface for the gadget extension. The system then establishes a communication interface between the second-level gadget extension and the gadget extension at the interface location of the gadget extension. Finally, the system uses functionality of the gadget extension within the second-level gadget extension.

In a variation on this embodiment, the gadget extension has the same structure as the host gadget. In yet a further variation, the gadget extension is itself a gadget.

In a variation on this embodiment, the communication interface is specified as a location in code that comprises the gadget, or as a pre-existing interface.

In a variation on this embodiment, the system receives data at the host gadget. In response to receiving the data, the system forwards the data to the gadget extension through the communication interface.

In a variation on this embodiment, the system receives a list of blacklisted gadget extensions. In this embodiment, the system is configured to deny the execution of the gadget extension if the gadget extension is a member of the list of blacklisted gadget extensions.

In a variation on this embodiment, the system receives a profile for a user that is executing the host gadget. The system then uses the profile to determine an appropriate gadget extension to execute for the user.

In a variation on this embodiment, the gadget can include one of a gadget, a widget, a servlet, an applet, and an application or program.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

In one embodiment of the present invention, a gadget is a component that includes a very specific functionality, and is compliant with a component framework. In some embodiments of the present invention, gadgets are downloadable application modules that provide services to a user. These gadgets require the presence of the component framework in order to function. The component framework acts as the root library for the gadgets, which allows the gadgets themselves to be compact. Many different companies have developed component frameworks. Some examples include Google Desktop™ from Google Inc., Microsoft Digital Dashboard Technologies™ from Microsoft Corp., and Apple Dashboard™ from Apple Computer Inc. While the embodiments are described in this application with reference to "gadgets," the present invention can apply to any components, widgets, gadgets, applets, etc. that are part of a component framework, such as those listed above. Furthermore, while gadgets are typically small in size and limited in functionality, it is possible for a gadget to be quite large and include all of the functionality of a full application.

Google Desktop™ provides a framework for developers to write mini-applications called gadgets and to run them as a part of Google Desktop™ (also called a plug-in model). The gadgets themselves are written using XML and scripting languages such as JavaScript/VBScript and distributed as a single compressed file. Note that in other variations of the present invention, different languages and file structures can be used in addition to the ones describe here.

Embodiments of the present invention aim to expand the functionality of gadgets through the use of gadget extensions. Gadget extensions (or simply 'extensions') are another type of component which enhances the functionality of a gadget. In other words, while a gadget works as a plug-in for Google Desktop™, a gadget extension works as a plug-in for a gadget. The gadget which supports the gadget extension is called the "host" gadget.

In one embodiment of the present invention, a gadget comprises the following pieces: (1) a "manifest" file describing the gadget, the gadget's title, the image of the gadget, the functionality of the framework that the gadget uses, the author of the gadget, a unique ID for the gadget, as well as other information; (2) an XML file describing the main "view" of the gadget, which comprises the User Interface (UI) elements to display, as well as code to handle various events and user input; (3) one or more script source files which include the source code for the gadget; (4) zero or more images and other media/data files specific to the gadget; and (5) zero or more XML files which list the strings used by the gadget, as well as these strings translated into all supported languages and placed in different locations based on the language.

Figure 1:
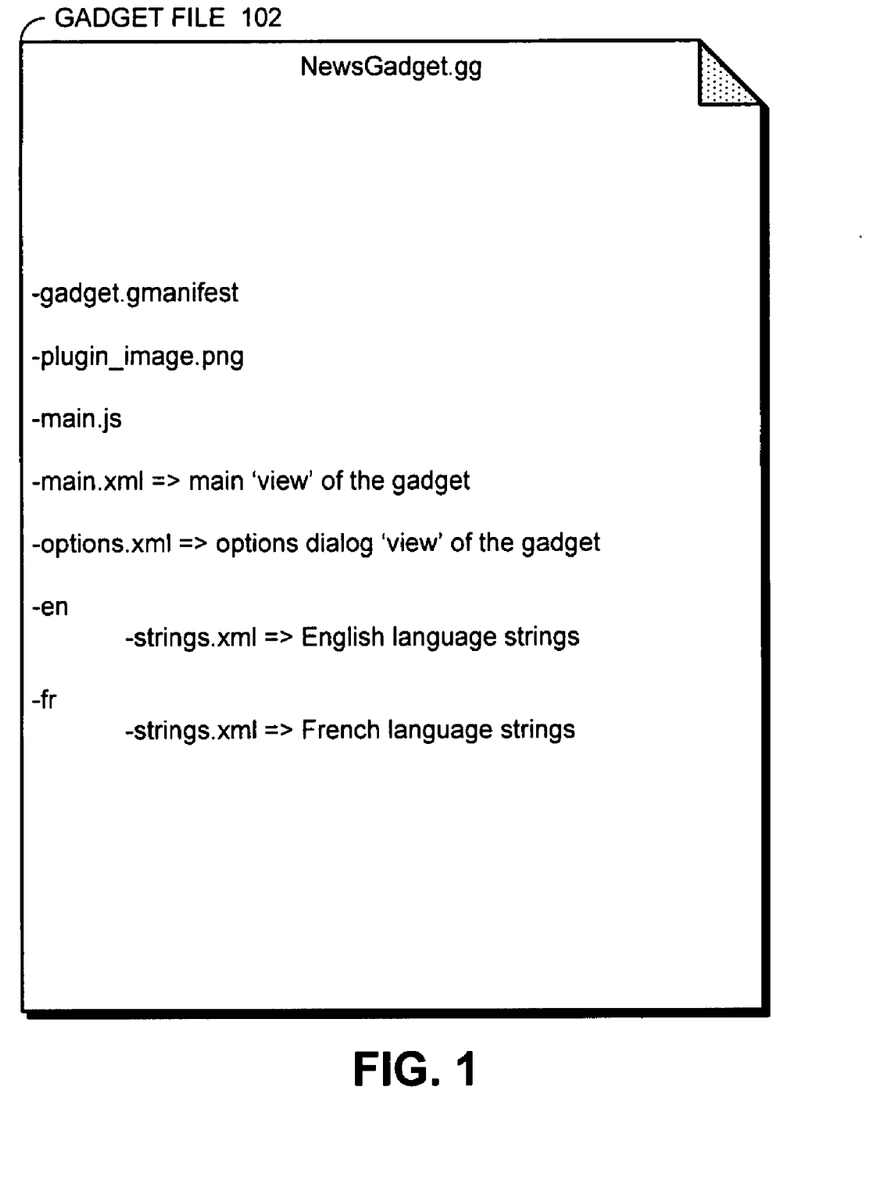
FIG. 1 illustrates the components of a gadget file in accordance with an embodiment of the present invention.

All of the files pertaining to the gadget are typically placed into a single compressed archive for ease of distribution; however, this is not a requirement. FIG. 1 illustrates the components of a typical gadget file, gadget file 102, in accordance with an embodiment of the present invention.

The structure of gadget extensions can be very similar in nature to the structure of gadget file 102. In one embodiment, gadget extensions have the same files with almost the same functionality managed by each file as does gadget file 102. The .gmanifest file describes the extension and its name, title, author etc., and additionally specifies which host gadget the gadget extension works with. The main.xml file describes the main entry point of the gadget extension, but is not related to the UI. In some implementations, a gadget extension may have its own UI. The options.xml file is used for the options dialog in exactly the same manner as in a gadget. Finally, the translated strings for the gadget extension are placed in the same manner as gadgets, under the language specific directory. In one embodiment of the present invention, the host gadget exposes an interface to its extensions, and vice versa. The host gadget and the gadget extensions then use these interfaces to communicate with each other.

Because the file structure of gadgets and gadget extensions are virtually identical, it is possible to have components that act as both a gadget and as a gadget extension. In other words, a gadget could be designed that interacts directly with the gadget framework, as well as with other host gadgets.

Because the underlying architecture and the package format are the same between gadgets and extensions, this similarity results in the following advantages: (1) developers who have written gadgets can also write extensions with very little learning curve; (2) the internationalization plan for extensions are the same as for gadgets, making development easier for developers; (3) development and debugging tools used for authoring gadgets can be used for working with extensions as well with minimal modifications; (4) the distribution channels for extensions can be the same as those for gadgets since they use the same package format and the install flow is very similar; (5) personalization engines which make use of keywords for gadgets and recommend specific gadgets based on user profiles will work right away with extensions as well, thus extensions can also be recommended to users based on their profiles very easily; and (6) enterprise features such as blacklisting malicious gadgets, blocking usage of specific gadgets and choosing the set of gadgets to enable on install can be extended for extensions as well.

Computing Environment

Figure 2:
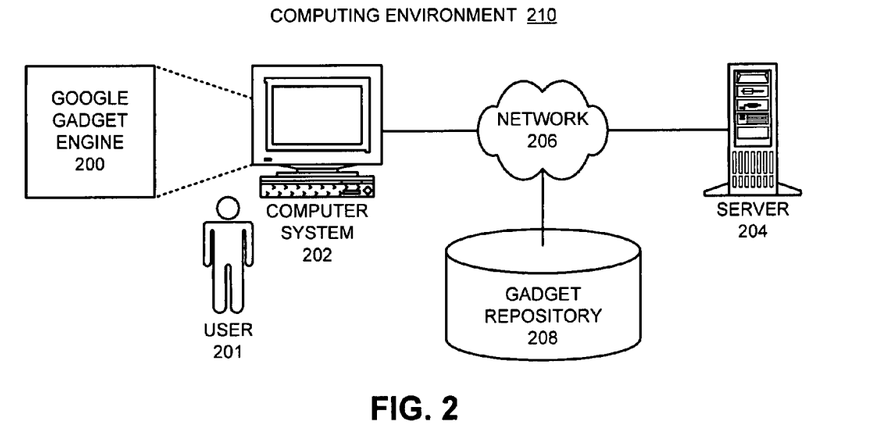
FIG. 2 illustrates a computing environment in accordance with an embodiment of the present invention.

FIG. 2 illustrates a computing environment 210 in accordance with an embodiment of the present invention. Computing environment 210 includes user 201, computer system 202, server 204, network 206, and gadget repository 208.

Computer system 202 can generally include any type of computer system, including, but not limited to, a computer system based on a microprocessor, a mainframe computer, a digital signal processor, a portable computing device, a personal organizer, a cell phone, a device controller, or a computational engine within an appliance.

Server 204 can generally include any computational node including a mechanism for servicing requests from a client for computational and/or data storage resources.

Gadget repository 208 can generally include any computational node including a mechanism for servicing requests from a client for computational and/or data storage resources. Additionally, gadget repository 208 can include any type of system for storing data in non-volatile storage. This includes, but is not limited to, systems based upon magnetic, optical, or magneto-optical storage devices, as well as storage devices based on flash memory and/or battery-backed up memory.

Computer system 202, server 204, and gadget repository 208 are coupled to network 206. Network 206 can generally include any type of wired or wireless communication channel capable of coupling together computing nodes. This includes, but is not limited to, a local area network, a wide area network, or a combination of networks. In one embodiment of the present invention, network 206 includes the Internet.

In one embodiment of the present invention, user 201 has installed Google Gadget Engine 200 (as part of Google Desktop™) on computer system 202. User 201 then searches network 206 for gadgets and gadget extensions to install on computer system 202. Note that user 201 can accomplish installation in numerous ways, such as receiving the gadget from server 204, browsing gadget repository 208 and downloading a gadget, receiving a gadget attached to an email, or any other way of receiving files known to those skilled in the art.

Host Gadget with Gadget Extensions

Figure 3:
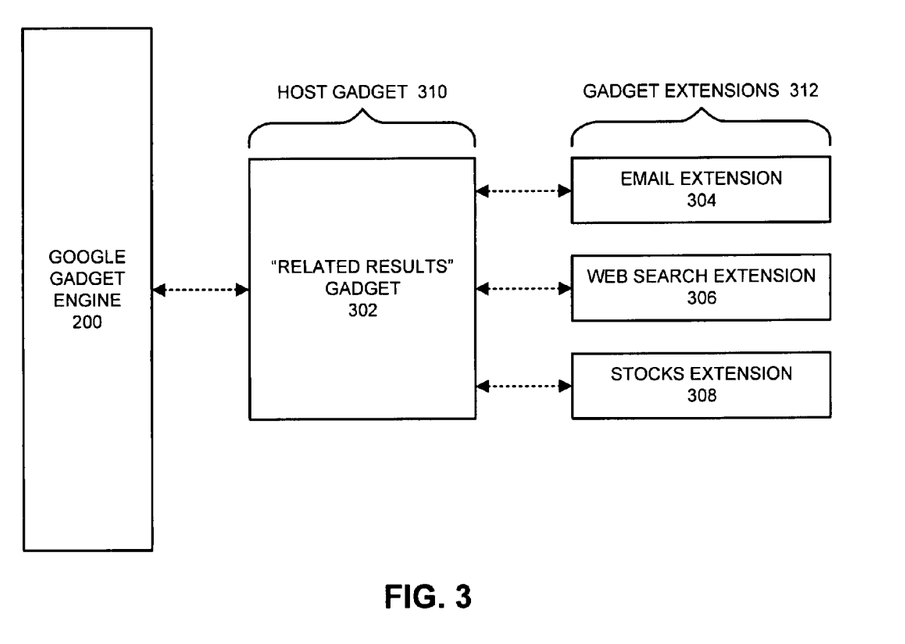
FIG. 3 illustrates a host gadget and its gadget extensions in accordance with an embodiment of the present invention.

FIG. 3 illustrates a host gadget 310 and its gadget extensions 312 in accordance with an embodiment of the present invention. In the example illustrated in FIG. 3, "related results" gadget 302 is the host gadget 310 for gadget extensions 312. In this example, "related results" gadget 302 communicates directly with Google Gadget Engine 200. Gadget extensions 312 (which includes email extension 304, web search extension 306, and stocks extension 308) extend the functionality of "related results" gadget 302 without communicating directly with Google Gadget Engine 200. Note that in some embodiments, gadget extensions 312 always communicate with host gadget 310, and may or may not need to communicate with Google Gadget Engine 200.

In this embodiment, "related results" gadget 302 is configured to collect various information on computer system 202 via the Google Gadget Engine 200. This information can include objects and events as they are accessed on computer system 202. For example, if user 201 is using a word processing program and types in an email address along with other text, "related results" gadget 302 detects that user 201 has typed in an email address and creates a copy of the email address within "related results" gadget 302.

Furthermore, "related results" gadget 302 may forward the email address to email extension 304, or email extension 304 may detect the presence of a new email address within "related results" gadget 302. Upon receiving the email address at "related results" gadget 302 or email extension 304, "related results" gadget 302 and email extension 304 may perform specific actions on the email address depending on the programmed functionality. These actions can include virtually anything that can be accomplished programmatically, such as automatically creating a new outgoing email or checking to see if new emails have arrived from the given email address.

As illustrated in FIG. 3, "related results" gadget 302 is extended by multiple gadget extensions 312. As user 201 types in the afore mentioned word processing program, common terms that user 201 typed could be obtained by web search extension 206 to provide easy one-click access to search results on network 206. Furthermore, as user 201 types letters that are construed by stocks extension 308 as ticker symbols, stocks extension 308 may proactively query a server, such as server 204, for the latest stock quote and display the results within stocks extension 308.

In another example not illustrated, host gadget 310 is a calendar gadget that interfaces with user 201's personal information manager on computer system 202. In this example, host gadget 310 allows user 201 quick and easy access to vital information, such as the details of user 201's next appointment, without user 201 having to open his or her personal information manager.

Consider the situation where user 201 now installs a second personal information manager that is specific to one of user 201's clients. In order to work with this client, user 201 must use the client's personal information manager for managing the relationship with that client. Also consider that host gadget 310 was not programmed to interface with the client's personal information manager. In this example, user 201 has historically been faced with three options. First, user 201 could just accept that he or she is not be able to obtain information from the client's personal information manager via host gadget 310, user 201 could duplicate all of the information from the client's personal information manager in his or her own personal information manager, or user 201 could write his or her own gadget that could interface with both systems. All three choices have significant drawbacks.

In one embodiment of the present invention, user 201 could create a gadget extension for host gadget 310 that extends the functionality of host gadget 310 to interface with the client's personal information manager. This allows user 201 to have the information that he or she desired through the gadget extension, without having to duplicate the functionality and programming of host gadget 310.

In another embodiment of the present invention, gadget extensions may extend more than one gadget. For example, a stock quote gadget extension may extend a gadget that pulls information form the New York Stock Exchange, as well as extending a gadget that pulls information from the Tokyo Stock exchange.

In yet another embodiment of the present invention, a gadget extension may extend a host gadget, as well as act as an independent gadget by communicating directly with Google Gadget Engine 200.

Executing Gadget Extensions

Figure 4:
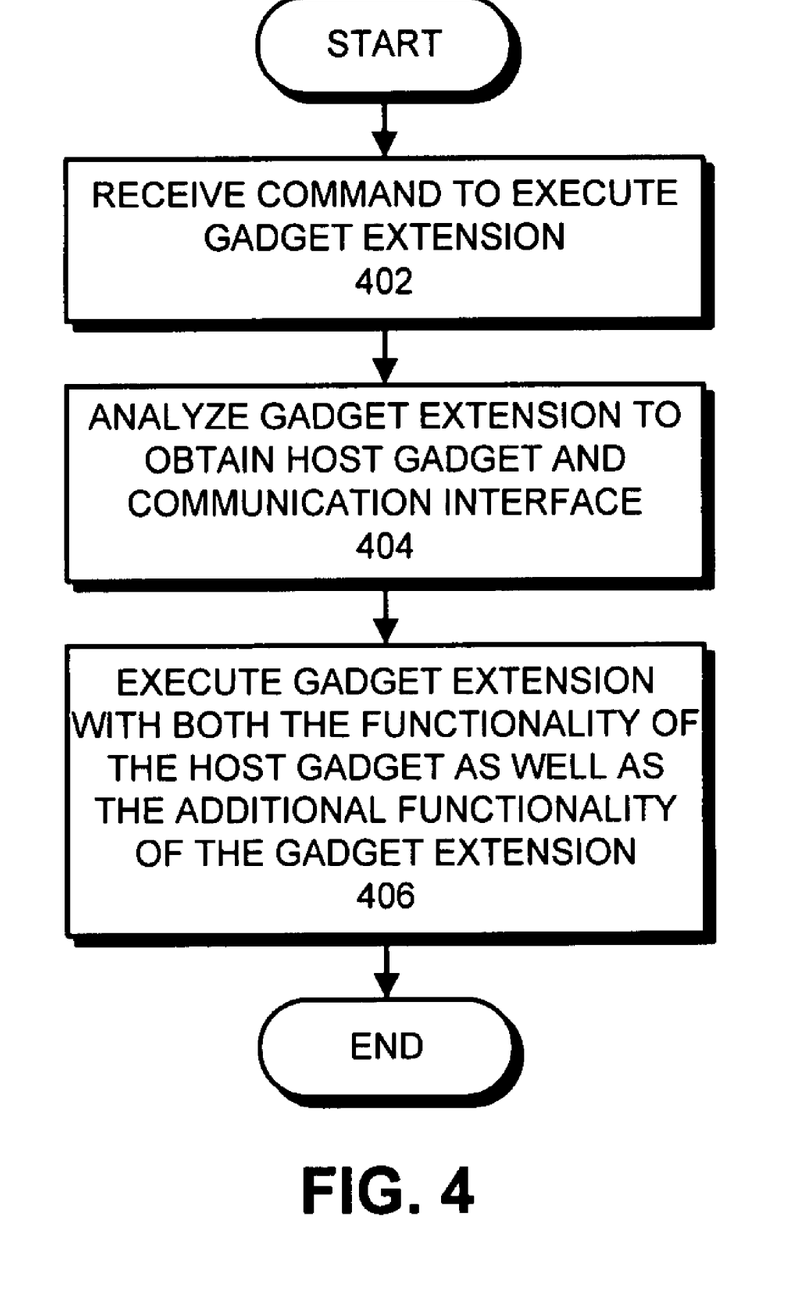
FIG. 4 presents a flow chart illustrating the process of executing a gadget extension in accordance with an embodiment of the present invention.

FIG. 4 presents a flow chart illustrating the process of executing a gadget extension in accordance with an embodiment of the present invention. The system starts be receiving a command to execute a gadget extension (step 402). Note that the command to execute the gadget extension can be issued by user 201 directly, or can be issued by the operating system at a scheduled time or during the booting process of computer system 202.

Next, the system analyzes the gadget extension to determine both the host gadget as well as the communication interface (step 404). Note that the communication interface can be implemented in a number of different ways. For example, the communication interface can include a pre-existing set of Application Programming Interfaces (APIs) on the host gadget that the gadget extension uses to create the communication channel with the host gadget. Alternatively, barring the existence of pre-existing APIs in the host gadget, the gadget extension could specify the exact location in the object code of the host gadget to interface with the object code of the gadget extension.

Finally, the gadget extension executes in the same manner as a regular gadget, and provides user 201 with all of the existing functionality of the host gadget along with the additional functionality of the gadget extension (step 406).

Gadget Extension Blacklist

Figure 5:
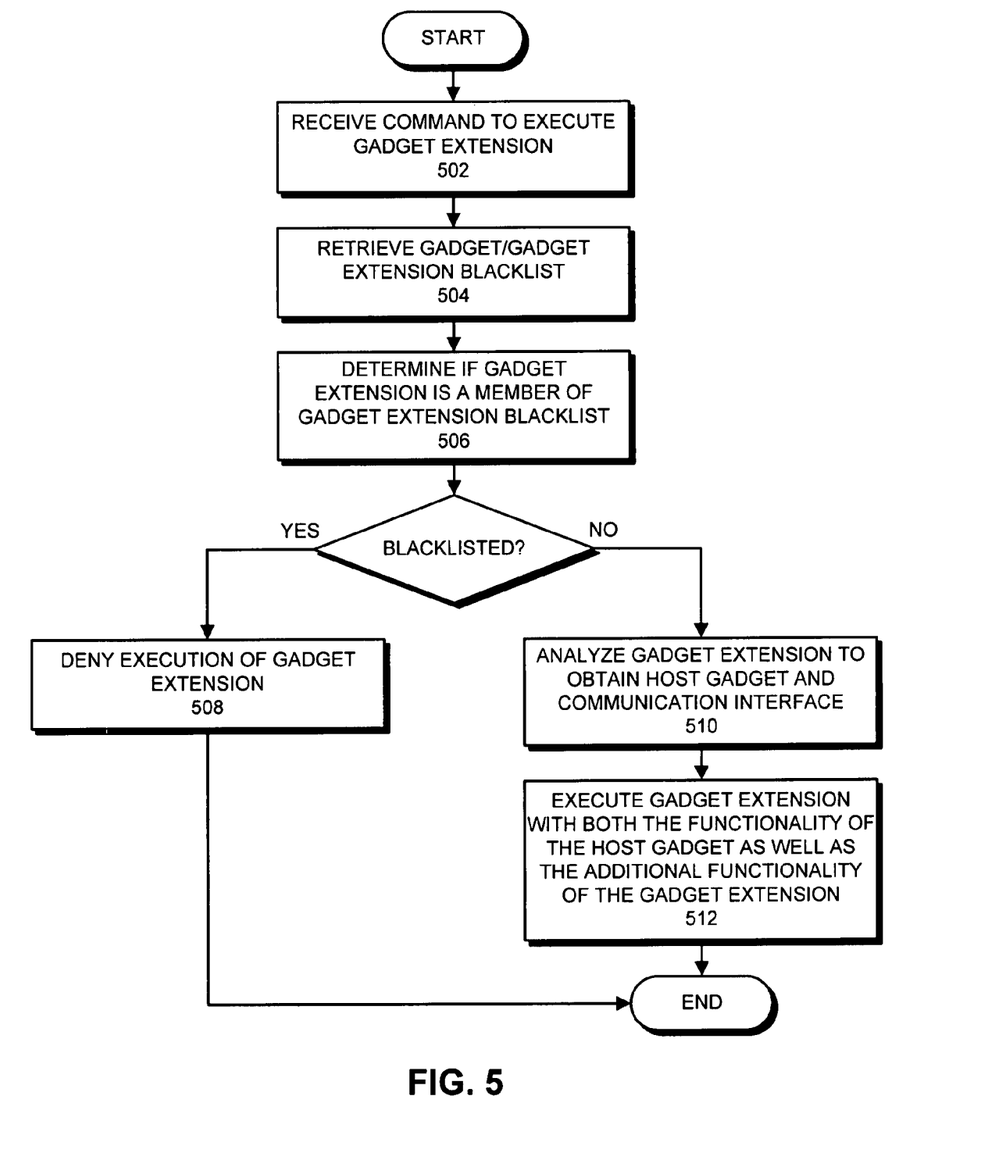
FIG. 5 presents a flow chart illustrating the process of implementing a gadget extension blacklist in accordance with an embodiment of the present invention.

FIG. 5 presents a flow chart illustrating the process of implementing a gadget extension blacklist in accordance with an embodiment of the present invention.

The system starts by receiving a command to execute a gadget extension (step 502). Next, the system retrieves the gadget/gadget extension blacklist (step 504). Note that the same blacklist can be used for both gadgets as well as gadget extensions. This further facilitates controlling gadget extension execution without major modifications to existing gadget frameworks.

The blacklist can be maintained locally, or may be obtained from a centralized repository such as the gadget repository 208 or an organization's policy server. In the case where the list is obtained via network 206, a local cache of the blacklist may stored to facilitate proper execution of gadget extensions during times when the blacklist is unavailable.

Next, the system determines if the gadget extension is a member of the gadget extension blacklist (step 506), and if so, denies the execution of the gadget extension (step 508). However, if the gadget extension is not a member of the gadget extension blacklist, the system analyzes the gadget extension to determine both the host gadget as well as the communication interface (step 510)

Finally, the gadget extension executes in the same manner as a regular gadget, and provides user 201 with all of the existing functionality of the host gadget along with the additional functionality of the gadget extension (step 512).

Overall, the design methodology of keeping the same package format and almost same set of API features for gadgets and gadget extension can help solve all the above cases with minimal effort and provide a highly extendable development framework, while not introducing any new programming paradigm such that developers have very little learning curve to learn about gadget extensions and can make the most use of extensions.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for extending a gadget, the method comprising:
   receiving a command to execute a gadget extension;
   analyzing the gadget extension to obtain from the gadget extension a specifier for an interface to a host gadget, wherein the specifier for the interface includes information identifying a set of application-programming interfaces (APIs) in the host gadget used to create a communication interface between the host gadget and the gadget extension;
   using the information in the specifier for the interface to establish a communication interface between the gadget extension and the host gadget through the interface; and
   executing the gadget extension to utilize functionality of the gadget extension and additional functionality of the host gadget within the gadget extension via communication through the communication interface.

2. The method of claim 1, further comprising:
   upon initially executing a second-level gadget extension which extends the gadget extension, obtaining a specifier for an interface for the gadget extension;
   establishing a communication interface between the second-level gadget extension and the gadget extension at the interface location of the gadget extension; and
   utilizing functionality of the gadget extension within the second-level gadget extension.

3. The method of claim 1, wherein the gadget extension has the same structure as the host gadget, and wherein the gadget extension is a gadget.

4. The method of claim 1, wherein the communication interface is specified as a location in code that comprises the host gadget, or as a pre-existing interface.

5. The method of claim 1, further comprising:
   receiving data at the host gadget; and
   forwarding the data to the gadget extension through the communication interface.

6. The method of claim 1, further comprising:
   receiving a list of blacklisted gadget extensions; and
   denying an execution of the gadget extension if the gadget extension is a member of the list of blacklisted gadget extensions.

7. The method of claim 1, further comprising:
   receiving a profile for a user that is executing the host gadget; and
   using the profile to determine an appropriate gadget extension to execute for the user.

8. The method of claim 1, wherein the gadget can include one of:
   a gadget;
   a widget;
   a servlet;
   an applet; and
   an application.

9. A non-transitory computer-readable storage medium storing instructions that when executed by a computer cause the computer to perform a method for extending a gadget, the method comprising:
   receiving a command to execute a gadget extension;
   analyzing the gadget extension to obtain from the gadget extension a specifier for an interface to a host gadget, wherein the specifier for the interface includes information identifying a set of application-programming interfaces (APIs) in the host gadget used to create a communication interface between the host gadget and the gadget extension;
   using the information in the specifier for the interface to establish a communication interface between the gadget extension and the host gadget through the interface; and
   executing the gadget extension to utilize functionality of the gadget extension and additional functionality of the host gadget within the gadget extension via communication through the communication interface.

10. The computer-readable storage medium of claim 9, wherein the method further comprises:
    upon initially executing a second-level gadget extension which extends the gadget extension, obtaining a specifier for an interface for the gadget extension;
    establishing a communication interface between the second-level gadget extension and the gadget extension at the interface location of the gadget extension; and
    utilizing functionality of the gadget extension within the second-level gadget extension.

11. The computer-readable storage medium of claim 9, wherein the gadget extension has the same structure as the host gadget, and wherein the gadget extension is a gadget.

12. The computer-readable storage medium of claim 9, wherein the communication interface is specified as a location in code that comprises the host gadget, or as a pre-existing interface.

13. The computer-readable storage medium of claim 9, wherein the method further comprises:
    receiving data at the host gadget; and forwarding the data to the gadget extension through the communication interface.

14. The computer-readable storage medium of claim 9, wherein the method further comprises:
    receiving a list of blacklisted gadget extensions; and
    denying an execution of the gadget extension if the gadget extension is a member of the list of blacklisted gadget extensions.

15. The computer-readable storage medium of claim 9, wherein the method further comprises:
    receiving a profile for a user that is executing the host gadget; and
    using the profile to determine an appropriate gadget extension to execute for the user.

16. The computer-readable storage medium of claim 9, wherein the gadget can include one of:
    a gadget;
    a widget;
    a servlet;
    an applet; and
    an application.

17. An apparatus configured for extending a gadget, the apparatus comprising:
    a processor;
    a memory that stores a host gadget and a gadget extension;
    an execution mechanism, executed by the processor, to receive a command to execute a gadget extension and analyze the gadget extension to obtain from the gadget extension a specifier for an interface to a host gadget, wherein the specifier for the interface includes information identifying a set of application-programming interfaces (APIs) in the host gadget used to create a communication interface between the host gadget and the gadget extension;
    a communication mechanism that uses the information in the specifier for the interface to establish a communication interface between the gadget extension and the host gadget through the interface; and
    wherein the execution mechanism further executes the gadget extension to utilize functionality of the gadget extension and additional functionality of the host gadget within the gadget extension via communication through the communication interface.

18. The apparatus of claim 17, further comprising:
    a second-level gadget extension;
    wherein the execution mechanism is further configured to obtain from a second-level gadget extension which extends the gadget extension a specifier for for an interface for the gadget extension; and
    wherein the communication mechanism is further configured to establish a communication interface between the second-level gadget extension and the gadget extension at the interface location of the gadget extension; and
    wherein the execution mechanism is further configured to utilize functionality of the gadget extension within the second-level gadget extension.

19. The apparatus of claim 17, wherein the gadget extension has the same structure as the host gadget, and wherein the gadget extension is a gadget.

20. The apparatus of claim 17, wherein the communication interface is specified as a location in code that comprises the host gadget, or as a pre-existing interface.

21. The apparatus of claim 17, further comprising:
    a receiving mechanism configured to receive data at the host gadget; and
    a forwarding mechanism configured to forward the data to the gadget extension through the communication interface.

22. The apparatus of claim 17, further comprising:
    a blacklist mechanism configured to receive a list of blacklisted gadget extensions; and
    wherein the execution mechanism is further configured to deny an execution of the gadget extension if the gadget extension is a member of the list of blacklisted gadget extensions.

23. The apparatus of claim 17, further comprising:
    a profile mechanism configured to receive a profile for a user that is executing the host gadget; and
    wherein the execution mechanism is further configured to use the profile to determine an appropriate gadget extension to execute for the user.

24. The apparatus of claim 17, wherein the gadget can include one of:
    a gadget;
    a widget;
    a servlet;
    an applet; and
    an application.

* * * * *

UNITED STATES PATENT AND TRADEMARK OFFICE
CERTIFICATE OF CORRECTION

PATENT NO. : 8,196,097 B1
APPLICATION NO. : 11/713412
DATED : June 5, 2012
INVENTOR(S) : Satish Sampath et al.

It is certified that error appears in the above-identified patent and that said Letters Patent is hereby corrected as shown below:

Column 10, Line 3; In Claim 18, "specifier for for an" should be "specifier for an".

Column 10, Line 4; In Claim 18, delete "and".

Signed and Sealed this
Twenty-third Day of October, 2012

David J. Kappos
*Director of the United States Patent and Trademark Office*